United States Patent
Lee et al.

(10) Patent No.: US 9,235,076 B2
(45) Date of Patent: Jan. 12, 2016

(54) TOUCH PANEL MODULE, TOUCH DEVICE AND MANUFACTURING METHOD THEREOF

(71) Applicant: TPK TOUCH SOLUTIONS (XIAMEN) INC., Xiamen (CN)

(72) Inventors: Yuh-Wen Lee, Hsinchu (TW);
Jen-Chang Liu, Tainan (TW);
Jiangqiang Zhuang, Xiamen (CN);
Tsung-Ke Chiu, Tainan (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 46 days.

(21) Appl. No.: 14/025,848

(22) Filed: Sep. 13, 2013

(65) Prior Publication Data

US 2014/0078417 A1    Mar. 20, 2014

(30) Foreign Application Priority Data

Sep. 20, 2012   (CN) .......................... 2012 1 0350412

(51) Int. Cl.
*G02F 1/1333* (2006.01)
*G06F 3/041* (2006.01)

(52) U.S. Cl.
CPC .......... *G02F 1/13338* (2013.01); *G06F 3/0412* (2013.01); *G06F 2203/04103* (2013.01); *G06F 2203/04107* (2013.01)

(58) Field of Classification Search
USPC .................................... 216/13, 24, 33, 62, 67
See application file for complete search history.

(56) References Cited

U.S. PATENT DOCUMENTS

| | | | |
|---|---|---|---|
| 2001/0018482 A1* | 8/2001 | Azechi et al. .................. | 524/439 |
| 2009/0189866 A1* | 7/2009 | Haffenden et al. ............ | 345/173 |
| 2012/0050225 A1* | 3/2012 | Chou et al. ..................... | 345/175 |
| 2012/0135210 A1* | 5/2012 | Walker et al. .................. | 428/212 |
| 2012/0200337 A1* | 8/2012 | Liu et al. ........................ | 327/517 |
| 2012/0206376 A1* | 8/2012 | Lin ................................. | 345/173 |
| 2013/0229362 A1* | 9/2013 | Liu et al. ........................ | 345/173 |

FOREIGN PATENT DOCUMENTS

| | | | |
|---|---|---|---|
| CN | 101292362 A | | 10/2008 |
| CN | 202383648 U | * | 8/2012 |
| TW | M429931 U | | 5/2012 |

* cited by examiner

*Primary Examiner* — Shamim Ahmed
(74) *Attorney, Agent, or Firm* — Gokalp Bayramoglu

(57) ABSTRACT

A touch panel module includes a substrate, a sensor layer disposed on the substrate, a first glue layer disposed on the sensor layer and an anti-electromagnetic interference layer disposed on the first glue layer. The touch panel module with anti-electromagnetic interference can be formed independently, and may be combined with other electronic device to form a touch device, thereby reducing the thickness of the touch device and simplifying the process steps.

15 Claims, 4 Drawing Sheets

TOUCH PANEL MODULE, TOUCH DEVICE AND MANUFACTURING METHOD THEREOF

BACKGROUND OF THE INVENTION

All related applications are incorporated by reference. The present application is based on, and claims priority from, China application Serial Number No. 201210350412.9, filed on Sep. 20, 2012, the disclosure of which is hereby incorporated by reference herein in its entirety.

FIELD OF THE INVENTION

The present invention relates to the field of touch input technology and more particularly to a touch panel and a manufacturing method thereof.

DESCRIPTION OF THE RELATED ART

Nowadays, personal digital assistants (PDA), mobile phones, notebook computers, tablet PCs and other portable electronic products are widely used in modern life. Since these electronic products need to be thin and light, the traditional input devices, such as keyboards or mice have to be replaced with other input devices. Further, as the need for tablet PCs has greatly increased, touch panel technology has become one of the key technologies in electronic products.

Generally, a touch panel is disposed on an electric device, since the touch panel tends to easily get affected by external electromagnetic interferences or the electromagnetic noise generated by the electronic devices. Hence, reducing these electromagnetic interferences and improving the stability of a touch panel has become one of important issues. Generally, a touch panel further comprises an anti-electromagnetic interference layer to reduce the interferences. However, the anti-electromagnetic interference layer is usually a conductive layer disposed on another substrate, so the thickness of the touch panel increases when the touch panel comprises an additional anti-electromagnetic interference layer (anti interference conductive layer), and the manufacturing process becomes more complicated.

BRIEF SUMMARY OF THE INVENTION

The disclosure provides a method for forming a touch panel process which can be simplified. During the manufacturing process of a touch panel, an anti interference conductive layer can be formed on an adhesive layer, there is no need to combine a anti interference conductive layer with the touch panel, and the manufacturing method can be simplified.

The present invention provides a touch panel module, comprising a sensing layer disposed on a substrate, a first adhesive layer disposed on the sensing layer, andan anti interference conductive layer, disposed on and directly formed on the first adhesive layer.

One embodiment of the present invention further comprises a protective layer disposed between the first adhesive layer and the sensing layer.

One embodiment of the present invention further comprises a flat film disposed between the substrate and the sensing layer.

One embodiment of the present invention further comprises a shading frame disposed between the substrate and the sensing layer.

In one embodiment of the present invention, the anti interference conductive layer can be indium tin oxides (ITO), indium zinc oxide (IZO), zinc oxide doping 3 oxidation 2 aluminum (AZO) or other solid conductive material.

In one embodiment of the present invention, the anti interference conductive layer can be nano silver, carbon nano tube (CNT), silver glue, poly (3,4-ethylenedioxythiophene) poly (styrene sulfonate) (PEDOT:PSS) or other liquid conductive material.

The present invention further provides a touch device, including a touch panel module comprising a sensing layer disposed on a substrate, a first adhesive layer disposed on the sensing layer and an anti interference conductive layer, disposed on and directly formed on the first adhesive layer, an electric device, a second adhesive layer disposed between the anti interference conductive layer and the electric device.

In one embodiment of the present invention, the electric device can be a display module or a circuit board.

The present invention further provides a method for forming a touch panel module, comprising the following steps: first, a sensing layer is formed on a substrate, a first adhesive layer is then formed on the sensing layer, and an anti interference conductive layer is formed on the first adhesive layer.

One embodiment of the present invention further comprises forming an electric device on the anti interference conductive layer, and forming a second adhesive layer between the anti interference conductive layer and the electric device.

One embodiment of the present invention further comprises performing a pre-treatment process on the first adhesive layer.

In one embodiment of the present invention, the pre-treatment process comprises a deep ultraviolet irradiation process, a shallow ultraviolet irradiation process or a plasma process.

In one embodiment of the present invention, the wavelength of the light source of the deep ultraviolet irradiation process and the shallow ultraviolet irradiation process is between 160~190 nm (nanometer), and the irradiation time is between 180~240 sec.

In one embodiment of the present invention, the plasma process comprises inputting 100~140 ml (milliliter) of argon and 60~100 ml of oxygen per minute, the pressure is between 35~55 Pa, and the processing time is between 800~1000 sec.

In one embodiment of the present invention, the formation step of the anti interference conductive layer comprising: forming the anti interference conductive layer made of a liquid conductive material on the first adhesive layer.

One embodiment of the present invention further comprises performing a pre-treatment process on the liquid conductive material.

In one embodiment of the present invention, the pre-treatment process comprises adding a co-solvent in the liquid conductive material.

In one embodiment of the present invention, the co-solvent comprises ethanol and dimethyl sulfoxide.

In one embodiment of the present invention, the volume ratio of the liquid conductive material and the co-solvent is 1:1~4.

The touch panel module of the present invention comprises an adhesive layer formed directly on the anti interference conductive layer, so as to have the touch panel module have anti interference functions. The touch panel module can be formed independently, and can be easily combined with other elements. For example, it can be combined with a display device or a circuit board, without the need for another substrate to form the anti interference conductive layer, thereby effectively reducing the thickness of the touch panel, and simplifying the manufacturing process.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention to users skilled in the technology of the present invention, preferred embodiments are detailed as follows. The preferred embodiments of the present invention are illustrated in the accompanying drawings with numbered elements to clarify the contents and effects to be achieved.

Please note that the figures are only for illustration and the figures may not be to scale. The scale may be further modified according to different design considerations. When referring to the words "up" or "down" that describe the relationship between components in the text, it is well known in the art and should be clearly understood that these words refer to relative positions that can be inverted to obtain a similar structure, and these structures should therefore not be precluded from the scope of the claims in the present invention.

Figure 1:
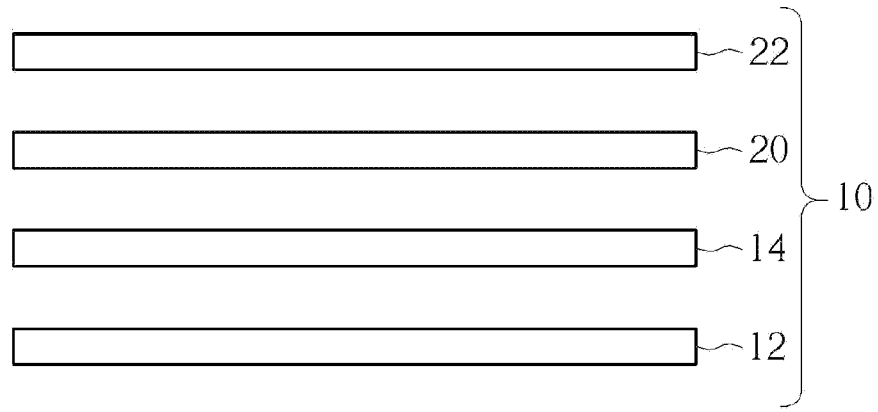
FIG. 1 is a cross sectional diagram showing a touch panel module according to the first preferred embodiment of the present invention.

Referring to FIG. 1 which is a cross sectional diagram showing a touch panel module according to the first preferred embodiment of the present invention. As shown in FIG. 1, a touch panel module 10 comprises a substrate 12, a sensing layer 14, a first adhesive layer 20 and an anti interference conductive layer 22. The substrate 12 can be made of transparent material or opaque material, not limited to be a rigid substrate or a flexible substrate, such as glass, polycarbonate (PC), polyethylene terephthalate (PET), polymethylmesacrylate (PMMA), polysulfone (PES) or other cyclic olefin copolymer material.

The sensing layer 14 is formed on the substrate 12, wherein the sensing layer 14 includes a plurality of first electrodes arranged along a first direction and a plurality of second electrodes arranged along a second direction, and a plurality of traces which one end of each trace is electrically connected to each first electrode or each second electrode, wherein the other end of each trace is electrically connected to a outside controller (not shown), but not limited thereto.

The first adhesive layer 20 is disposed on the sensing layer 14, and the anti interference conductive layer 22 is disposed on the first adhesive layer 20. The first adhesive layer 20 can be optical curing glue, humidity curing glue, thermosetting glue or other glue used for bonding. The anti interference conductive layer 22 can be a solid film, attached on the first adhesive layer 20, or formed on the first adhesive layer 20 through spin coating, plating, sputtering, printing or other methods. The anti interference conductive layer 22 can be made of solid conductive material or liquid conductive material, with solid conductive material such as indium tin oxides (ITO), indium zinc oxide (IZO), zinc oxide doping 3 oxidation 2 aluminum (AZO); and liquid conductive material such as nano silver, carbon nano tube (CNT), poly(3,4-ethylenedioxythiophene) poly styrene sulfonate (PEDOT:PSS), or other metal like silver glue. Due to the anti interference conductive layer 22 being formed directly on the first adhesive layer 20, the touch panel module 10 intrinsically has an anti-electromagnetic interference function.

Besides, others elements may further be added to the touch panel module 10, and achieve different embodiments of the present invention. The following description will detail the different embodiments of the touch panel of the present invention. To simplify the description, the following description will detail the dissimilarities among the different embodiments and the identical features will not be redundantly described. In order to compare the differences between the embodiments easily, the identical components in each of the following embodiments are marked with identical symbols.

Figure 2:
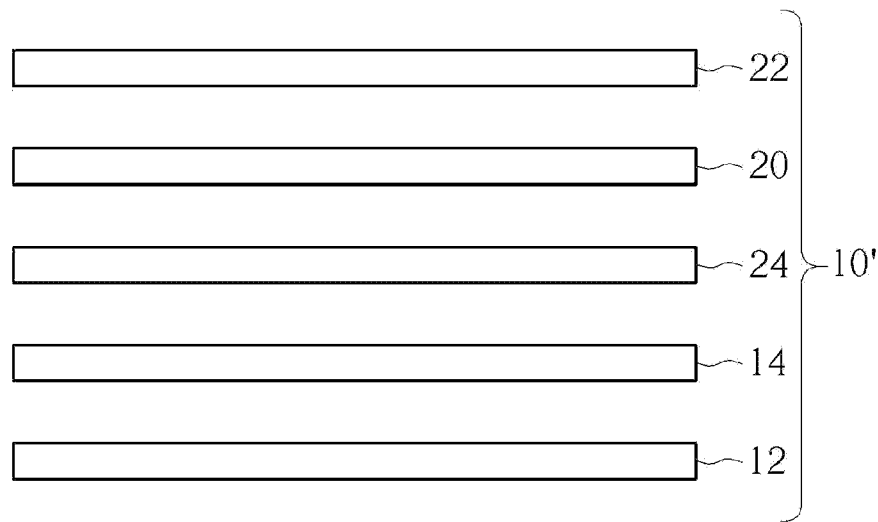
FIG. 2 is a cross sectional diagram showing a touch panel module according to the second preferred embodiment of the present invention.

FIG. 2 is a cross sectional diagram showing a touch panel module according to the second preferred embodiment of the present invention. As shown in FIG. 2, a touch panel module 10' comprises the substrate 12, the sensing layer 14, the first adhesive layer 20 and the anti interference conductive layer 22. The difference between this embodiment and the first preferred embodiment is that the touch panel 10' further comprises a protective layer 24 disposed between the first adhesive layer 20 and the sensing layer 14. The protective layer 24 is usually an insulating film that covers and protects the sensing layer 14 from being damaged. The material of the protective layer 24 can be selected from the group of polyimide (PI), ink, $S_3N_4$ or $SiO_2$, but not limited thereto. It is worth noting that the protective layer 24 is selectively formed according to actual requirements. The other components, material properties, and manufacturing method of the touch panel 10' are similar to those of the first preferred embodiment detailed above and will not be redundantly described.

Figure 3:
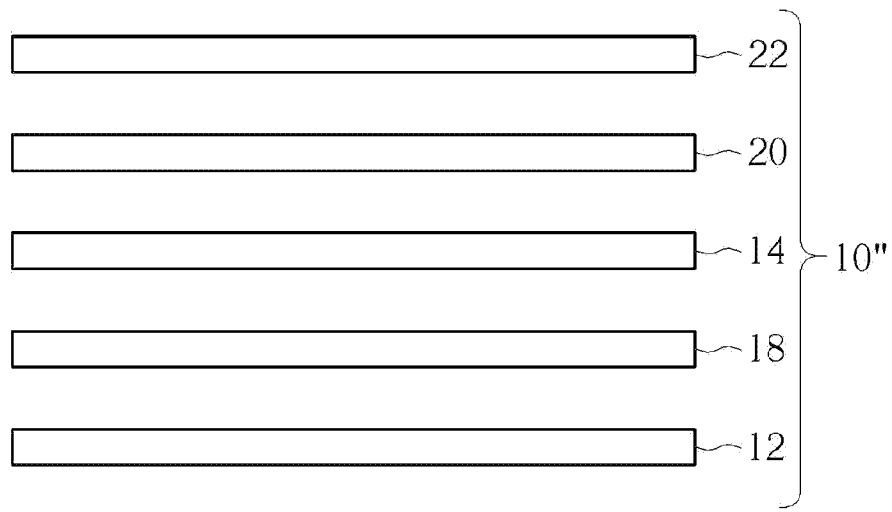
FIG. 3 is a cross sectional diagram showing a touch panel module according to the third preferred embodiment of the present invention.

FIG. 3 is a cross sectional diagram showing a touch panel module according to the third preferred embodiment of the present invention. As shown in FIG. 3, the touch panel module 10" comprises the substrate 12, the sensing layer 14, the first adhesive layer 20 and the anti interference conductive layer 22. The difference between this embodiment and the first preferred embodiment is that the touch panel 10" further comprises a flat film 18 disposed between the sensing layer 14 and the substrate 12. The flat film 18 is preferably made of non-conductive material. The flat film 18 covers the upper surface or the lower surface of the substrate 12, or may also cover the upper surface and the lower surface simultaneously to solve the issue of unevenness of the upper surface and the lower surface of the substrate 12, so that the sensing layer 14 can be formed on a flat surface. The flat film 18 may also be a smoothing layer made of polymer material, such as polyimide (PI), or made of inorganic material such as $Si_3N_4$ or $SiO_2$, but the present invention is not limited thereto. It is worth noting that this embodiment can be combined with the second embodiment; in other words, the touch panel module 10" may further have a protective layer 24 disposed between the first adhesive layer 20 and the sensing layer 14. The other components, material properties, and manufacturing method of the touch panel 10″ are similar to those of the first preferred embodiment detailed above and will not be redundantly described.

Figure 4:
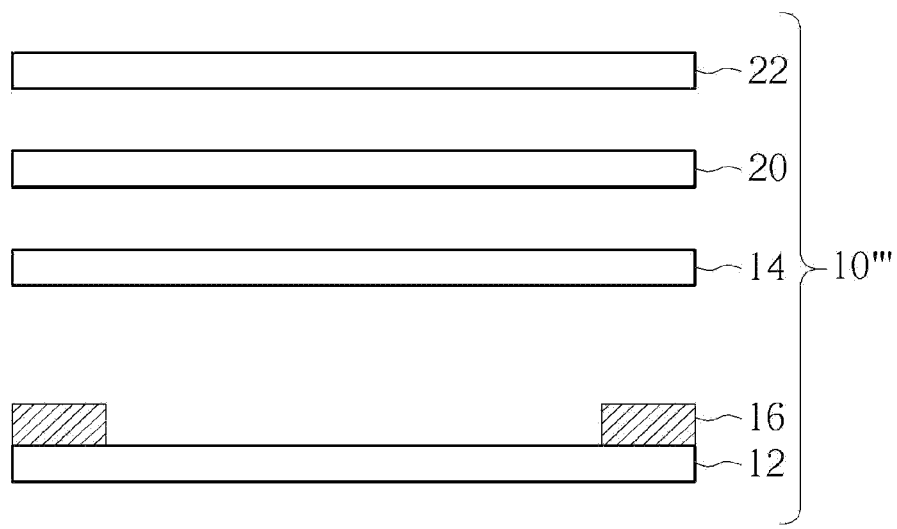
FIG. 4 is a cross sectional diagram showing a touch panel module according to the fourth preferred embodiment of the present invention.

FIG. 4 is a cross sectional diagram showing a touch panel module according to the fourth preferred embodiment of the present invention. As shown in FIG. 4, the touch panel module 10′″ comprises the substrate 12, the sensing layer 14, the first adhesive layer 20 and the anti interference conductive layer 22. The difference between this embodiment and the first preferred embodiment is that the touch panel 10′″ further comprises a shading frame 16 disposed between the sensing layer 14 and the substrate 12, the shading frame 16 is usually made of opaque material such as dark photoresist. The shading frame 16 covers the periphery region of the substrate 12, to hide some electric elements not to be exposed on the user interface. It is worth noting that this embodiment can be combined with the second or the third embodiments, in other words, the touch panel module 10′″ may further have a protective layer 24 disposed between the first adhesive layer 20 and the sensing layer 14, or further comprises a flat film 18 disposed between the sensing layer 14 and the substrate 12, wherein the flat film 18 may cover the substrate 12 and the shading frame 16, or only cover the central region of the substrate 12 and not extend to the shading frame 16 top, so as to have the top surface of the shading frame 16 to be on the same level as the top surface of the flat film 18. The other components, material properties, and manufacturing method of the touch panel 10′″ are similar to those of the first preferred embodiment detailed above and will not be redundantly described.

The protective layer 24, the shading frame 16 and the flat film 18 mentioned above can be selective added in the touch panel module 10 of the present invention according to actual requirements. The various combinations should be covered in the scope of the present invention. In addition, when the touch panel module 10 only has one substrate 12, wherein the substrate 12 can be a cover lens of the touch panel, and the sensing layer 14 is directly formed on the substrate 12, it forms a touch on lens (TOL) structure.

The feature of the present invention is that the anti interference conductive layer 22 is formed directly on the first adhesive layer 20 of the touch panel module 10, so the touch panel module 10 intrinsically has an anti-electromagnetic interference function. In addition, the touch panel module 10 can be formed independently, and be combined with other electric devices to become a touch device, and there is no need to form another anti interference conductive layer when combined.

Figure 5:
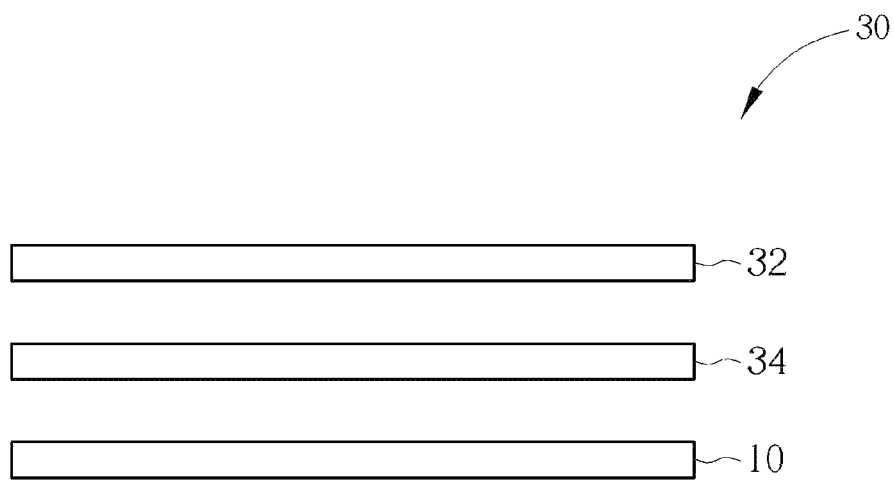
FIG. 5 is a cross sectional diagram showing a touch device according to the first preferred embodiment of the present invention.

The touch panel modules 10~10′″ of the first to fourth embodiments mentioned above can be combined with an electric device to become a touch device. Here are some examples describing the combination of the touch panel module 10 and electronic devices. FIG. 5 is a cross sectional diagram showing a touch device according to the first preferred embodiment of the present invention.

As shown in FIG. 5, a touch device 30 comprises the touch panel module 10, a second adhesive layer 34 and an electric device 32. The second adhesive layer 34 is disposed between the touch panel module 10 and the electric device 32 to bond the touch panel module 10 to the electric device 32.

The touch panel module 10 is disposed on the electric device 32 used as a touch input device. In this embodiment, the touch panel module 10 with the anti-electromagnetic interference function is combined with the electric device 32, and achieves the touch device 30. When the touch device 30 is used as a display device such as a touch display panel, the electric device 32 can be a display module, such as a liquid crystal layer, a color filter, a circuit board or a backlight module, but not limited thereto, especially if the touch device 30 is used as a non-display device. Further, the substrate 12 is a transparent substrate, and the sensing layer 14 is made of transparent material when the electric device 32 is a display module.

In the touch panel module 10 of the present invention, the anti interference conductive layer is directly formed on the first adhesive layer 20 so the structure can easily be combined with others electric devices, and only needs have the second adhesive layer formed between the touch panel module 10 and the electric device 32 to bond them one another, and does not need any other substrate to introduce the anti interference conductive layer, thereby reducing the thickness of the electric device 32, and simplifying the manufacturing process. Although this embodiment uses the touch panel module 10 combined with the electric device 32 in this example, the present invention is not limited thereto; the touch panel modules 10′, 10″ or 10′″ of the second to fourth preferred embodiments can also be combined with the electric device 32 to achieve touch devices of different embodiments. It can be understood that the various embodiments should be comprised in the scope of the present invention.

Figure 6:
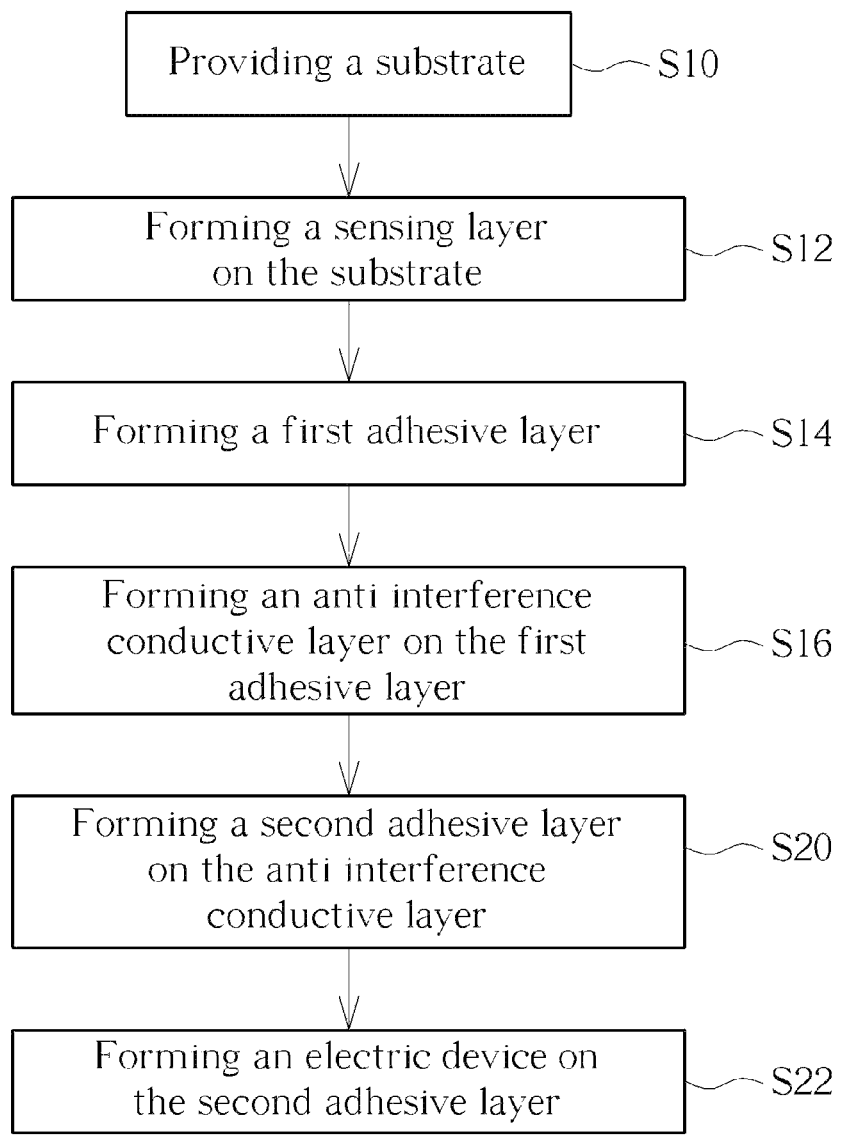
FIG. 6 is a flow chart showing the method for forming a touch device according to the first preferred embodiment of the present invention.

The touch panel module and the touch device mentioned above can be formed through the manufacturing processes provided by the present invention. Please refer to FIG. 1 and FIG. 6, FIG. 6 is a flow chart showing the method for forming a touch device according to the first preferred embodiment of the present invention. The method comprises step S10: providing a substrate 12; step S12: forming a sensing layer 14 on the substrate 12; step S14: forming a first adhesive layer 20 on the sensing layer 14, and step S16: forming an anti interference conductive layer 22 on the first adhesive layer 20, wherein the material of the anti interference conductive layer 22 includes solid conductive material or liquid conductive material.

Generally, when the material of the anti interference conductive layer 22 is a solid conductive material, the anti interference conductive layer 22 can be formed through a sputtering, an electroplating, or a film lamination method on the surface of the first adhesive layer 20. However, the adhesivity on surface of the first adhesive layer 20 is higher, in order to improve the formation of the anti interference conductive layer 22, or to avoid the issue of unevenness of the surface of the anti interference conductive layer 22. The present invention therefore selectively comprises performing a pre-treatment process on the first adhesive layer 20 before the formation of the anti interference conductive layer 22. The pre-treatment process may be a deep ultraviolet irradiation process, a shallow ultraviolet irradiation process or a plasma process. The wavelength of the light source of the deep ultraviolet irradiation process and the shallow ultraviolet irradiation process is between 160~190 nm (nanometer), and the irradiation time is between 180~240 sec. The plasma process comprises inputting 100~140 ml (milliliter) of argon and 60~100 ml of oxygen into the chamber per minute, wherein the pressure is between 35~55 Pa, and the processing time is between 800~1000 sec. But the parameter mentioned above can be adjusted according to actual requirements, and the present invention is not limited thereto.

When the material of the anti interference conductive layer 22 is a liquid conductive material, since the anti interference conductive layer 22 is incompatible with the first adhesive layer 20, so the anti interference conductive layer 22 can not be formed on the first adhesive layer 20 without performing any pre-treatment process. The first adhesive layer 20 may undergo the pre-treatment process mentioned above. Besides, apart from performing the pre-treatment process on the first adhesive layer 20, the anti interference conductive layer 22 made of liquid conductive material may also undergo a pre-treatment process that includes adding a co-solvent into the conductive liquid, for example, when the main component of the conductive liquid is a high conductivity molecules component (such as PEDOT:PSS), the co-solvents preferably are ethanol and dimethyl sulfoxide (DMSO) wherein the volume ratio of the conductive liquid, ethanol and DMSO is preferably 1:1~3:0.1~0.5. When the main component of the anti interference conductive layer 22 is nano silver, the co-solvents preferably are ethanol and DMSO, wherein the volume ratio of the conductive liquid, ethanol and DMSO is preferably 1:1~3:0.3~0.8. In sum, the volume ratio of the conductive liquid to the co-solvents is about 1:1~4. However, the present invention is not limited thereto, others adjusted volume ratios should be comprised in the scope of the present invention.

After the anti interference conductive layer 22 is composed by a certain percentage, mixed and filtered, the liquid conductive material can be coated on the first adhesive layer 20 through direct coating, spin coating, electroplating, printing or other methods. Afterwards, another film-forming step is needed to form the liquid conductive material on the anti interference conductive layer 22. The film-forming step can be adjusted according to the different compositions of the anti interference conductive layer 22; for example, if the liquid conductive material is PEDOT:PSS or other similar material, it may be dried in vacuum for about 5~20 minutes, or be heated at 30~100° C. for about 10~50 minutes; If the liquid conductive material is nano silver or other similar material, it is preferably heated at 60~50° C. for about 90~120 minutes. It is worth nothing that the pre-treatment process which is performed on the first adhesive layer 20 is different from the pre-treatment processes which is performed on the anti interference conductive layer 22, but it is not limited thereto. The present invention comprises performing one of those two pre-treatment processes, or, preferably, performing both of those two pre-treatment processes to promote the formation of the anti interference conductive layer 22 on the first adhesive layer 20.

In addition, the manufacturing method mentioned above may further comprise forming a shading frame between the substrate and the sensing layer, the shading frame covers the periphery region of the substrate, to shade extra light and enhance the appearance. A flat film can be selectively formed on the upper surface or the lower surface of the substrate to solve the issue of unevenness of the substrate surface. It is worth noting that the shading frame and the flat film can be formed respectively, and do not need to coexist. A protective layer can be selectively formed between the sensing layer and the first adhesive layer, to avoid the sensing layer from further damages. Of course, the presence of the shading frame, the flat film and the protective layer are not limited. The shading frame, the flat film and the protective layer can be combined with the touch panel of the present invention. All various combinations should be comprised in the scope of the present invention. The material and the manufacturing methods of the shading frame, the flat film and the protective layer described here are similar to those of the preferred embodiments shown in FIGS. 2-4 and will not be redundantly described.

The steps S10~S16 mentioned above describe the process for forming the first preferred embodiment of the present invention. Besides, after the touch panel module is formed, the present invention further comprises step S20: forming a second adhesive layer on the anti interference conductive layer, and step S22: forming an electric device on the second adhesive layer, to combine the touch panel module with the electric device, thereby completing a touch device. In addition, the shading frame, the flat film and the protective layer can also be combined with the touch device of the present invention. The touch device of the present invention is a touch panel, or other opaque touch devices. When the touch device is a touch panel, each layer (comprising the substrate, the sensing layer, the first adhesive layer and the anti interference conductive layer) are preferably made of transparent material in order to achieve the translucent effect. On the contrary, when the touch device is another opaque touch device, the material of those layers are not limited thereto. The other components, material properties, and manufacturing methods of this embodiment are similar to those of the first to fourth preferred embodiments detailed above and will not be redundantly described.

In summary, the touch panel module of the present comprises an adhesive layer directly formed on the anti interference conductive layer, so that the touch panel module provides anti interference functions. The touch panel module can be formed independently, and can be easily combined with others elements. For example, it can be combined with a display device or a circuit board, with no need for another substrate to form the anti interference conductive layer, thereby the thickness of the touch panel can effectively be reduced, and the manufacturing process can be simplified.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for forming a touch panel module, comprising the following steps:
   forming a sensing layer on a substrate;
   forming a first adhesive layer on the sensing layer; and
   preparing a liquid conductive material of poly(3,4-ethyl enedioxythiophene) poly styrene sulfonate (PEDOT:PSS), and disposing the liquid conductive material of poly(3,4-ethyl enedioxythiophene) poly styrene sulfonate (PEDOT:PSS) on the first adhesive layer;
   curing the liquid conductive material of poly(3,4-ethyl enedioxythiophene) poly styrene sulfonate (PEDOT:PSS) as an anti interference conductive layer on the first adhesive layer.

2. The method of claim 1, further comprising forming an electric device on the anti interference conductive layer, and forming a second adhesive layer between the anti interference conductive layer and the electric device.

3. The method of claim 2, wherein the electric device is a display module or a circuit board.

4. The method of claim 1, further comprising forming a protective layer between the first adhesive layer and the sensing layer.

5. The method of claim 1, further comprising forming a flat film between the substrate and the sensing layer.

6. The method of claim 1, further comprising forming a shading frame between the substrate and the sensing layer.

7. The method of claim 1, further comprising performing an ultraviolet irradiation process on the first adhesive layer, wherein a wavelength of a light source in the ultraviolet irradiation process is ranged from 160 to 190 nanometers, and an irradiation time is ranged from 180 to 240 seconds.

8. The method of claim 1, further comprising performing a plasma process on the first adhesive layer, wherein the plasma process comprises inputting argon of 100 to 140 milliliters per minute and oxygen of 60 to 100 milliliters per minute with a pressure ranged between 35 to 55 Pa, and wherein a processing time of the plasma process is ranged from 800 to 1000 seconds.

9. The method of claim 1, further comprising performing a pre-treatment process on the liquid conductive material of poly(3,4-ethyl enedioxythiophene) poly styrene sulfonate (PEDOT:PSS), wherein the pre-treatment process includes mixing the liquid conductive material of poly(3,4-ethyl enedioxythiophene) poly styrene sulfonate (PEDOT:PSS) with ethanol and dimethyl sulfoxide, and wherein the volume ratio of the liquid conductive material of poly(3,4-ethyl enedioxythiophene) poly styrene sulfonate (PEDOT:PSS), ethanol and dimethyl sulfoxide is 1:1~3:0.1~0.5.

10. The method of claim 1, wherein the step of curing the liquid conductive material of poly(3,4-ethyl enedioxythiophene) poly styrene sulfonate (PEDOT:PSS) comprises curing the liquid conductive material of poly(3,4-ethyl enedioxythiophene) poly styrene sulfonate (PEDOT:PSS) in vacuum for about 5~20 minutes, or heating the liquid conductive material of poly(3,4-ethyl enedioxythiophene) poly styrene sulfonate (PEDOT:PSS) at 30~100° C. for about 10~50 minutes.

11. A method for forming a touch panel module, comprising the following steps:
  forming a sensing layer on a substrate;
  forming a first adhesive layer on the sensing layer;
  preparing a liquid conductive material of nano silver, and disposing the liquid conductive material of nano silver on the first adhesive layer; and
  curing the liquid conductive material of nano silver as an anti interference conductive layer on the first adhesive layer.

12. The method of claim 11, further comprising performing an ultraviolet irradiation process on the first adhesive layer, wherein a wavelength of a light source in the ultraviolet irradiation process is ranged from 160 to 190 nanometers, and an irradiation time is ranged from 180 to 240 seconds.

13. The method of claim 11, further comprising performing a plasma process on the first adhesive layer, wherein the plasma process comprises inputting argon of 100 to 140 milliliters per minute and oxygen of 60 to 100 milliliters per minute with a pressure ranged between 35 to 55 Pa, and wherein a processing time of the plasma process is ranged from 800 to 1000 seconds.

14. The method of claim 11, further comprising performing a pre-treatment process on the liquid conductive material of nano silver, wherein the pre-treatment process includes mixing the liquid conductive material of nano silver with ethanol and dimethyl sulfoxide, and wherein the volume ratio of the liquid conductive material of nano silver, ethanol and dimethyl sulfoxide is 1:1~3:0.3~0.8.

15. The method of claim 11, wherein the step of curing the liquid conductive material of nano silver comprises heating the liquid conductive material of nano silver at 50~60° C. for about 90~120 minutes.

* * * * *